US012603284B2

(12) United States Patent
Yoo et al.

(10) Patent No.: US 12,603,284 B2
(45) Date of Patent: Apr. 14, 2026

(54) MANUFACTURING METHOD OF ANODE ACTIVE MATERIAL AND SECONDARY BATTERY COMPRISING THE SAME

(71) Applicant: FIC ADVANCED MATERIALS, INC., Pohang-si (KR)

(72) Inventors: Sung Woon Yoo, Seoul (KR); Hyun Ho Lee, Hwaseong-si (KR); Byung Gwan Lee, Hwaseong-si (KR)

(73) Assignee: FIC ADVANCED MATERIALS, INC., Pohang-si (KR)

( * ) Notice: Subject to any disclaimer, the term of this patent is extended or adjusted under 35 U.S.C. 154(b) by 566 days.

(21) Appl. No.: 18/006,542

(22) PCT Filed: Jul. 9, 2021

(86) PCT No.: PCT/KR2021/008767
§ 371 (c)(1),
(2) Date: Jan. 23, 2023

(87) PCT Pub. No.: WO2022/019542
PCT Pub. Date: Jan. 27, 2022

(65) Prior Publication Data
US 2023/0299290 A1      Sep. 21, 2023

(30) Foreign Application Priority Data
Jul. 24, 2020    (KR) ........................ 10-2020-0092116

(51) Int. Cl.
*H01M 4/587*      (2010.01)
*H01M 50/46*      (2021.01)
*H01M 4/02*       (2006.01)

(52) U.S. Cl.
CPC .......... *H01M 4/587* (2013.01); *H01M 50/46* (2021.01); *H01M 2004/021* (2013.01); *H01M 2004/027* (2013.01)

(58) Field of Classification Search
CPC ................. H01M 4/587; H01M 50/46; H01M 2004/021; H01M 2004/027; Y02E 60/10; A01B 1/16; A01B 1/04
See application file for complete search history.

(56) References Cited

U.S. PATENT DOCUMENTS

| 9,077,044 B2 | 7/2015 | Yoon et al. | |
| 2005/0014067 A1* | 1/2005 | Tenno ................... | H01M 4/364 |
| | | | 252/182.1 |
| 2019/0334173 A1 | 10/2019 | Ikado et al. | |

FOREIGN PATENT DOCUMENTS

| CN | 106784640 B | 5/2020 |
| JP | 2014-165018 A | 9/2014 |

(Continued)

*Primary Examiner* — Michael Y Sun
(74) *Attorney, Agent, or Firm* — NKL LAW; Jae Youn Kim

(57) ABSTRACT

The present invention relates to a method for preparing an anode active material including the steps of: obtaining graphite byproduct particles that have not been spheroidized in a step of pulverizing and spheroidizing flaky graphite particles; preparing coated particles by liquid phase mixing the graphite byproduct particles with composite particles to coat the surface of the graphite byproduct particles with the composite particles; spheroidizing the coated particles by performing an isostatic pressing process thereon; and pulverizing the coated particles and coating the surface thereof with amorphous carbon to prepare spherical graphite.

2 Claims, 2 Drawing Sheets

(56)     References Cited

FOREIGN PATENT DOCUMENTS

| JP | 6251968 | B2 | 12/2017 | |
| KR | 10-0274233 | B1 | 2/2001 | |
| KR | 10-2007-0113066 | A | 11/2007 | |
| KR | 10-2009-0109225 | A | 10/2009 | |
| KR | 20090109225 | A * | 10/2009 | ......... H01M 10/052 |
| KR | 10-2013-0107892 | A | 10/2013 | |
| KR | 10-2014-0082036 | A | 7/2014 | |
| KR | 1020160057255 | A | 5/2016 | |
| KR | 10-2018-0094747 | A | 8/2018 | |
| KR | 10-1919470 | B1 | 8/2018 | |
| KR | 10-2019-0007245 | A | 1/2019 | |
| KR | 10-1965773 | B1 | 4/2019 | |
| KR | 10-1986680 | B1 | 6/2019 | |
| KR | 10-2019-0101179 | A | 8/2019 | |
| KR | 10-2156529 | B1 | 9/2020 | |
| WO | 2017/099456 | A1 | 6/2017 | |

* cited by examiner

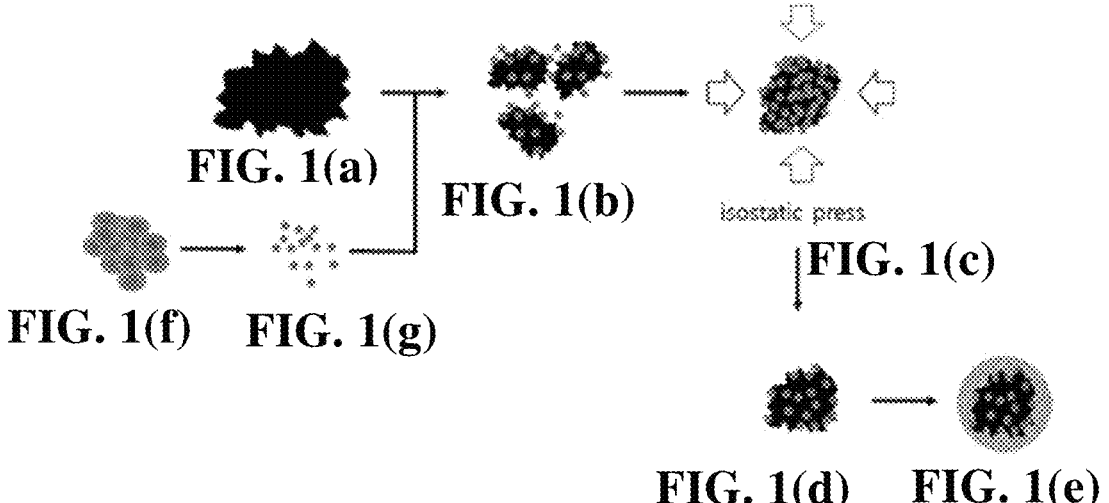
FIG. 1(a)
FIG. 1(b)
isostatic press
FIG. 1(c)
FIG. 1(f)     FIG. 1(g)
FIG. 1(d)     FIG. 1(e)
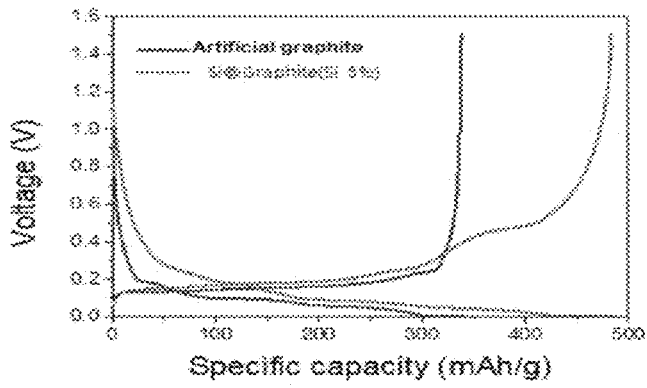
FIG. 2(a)
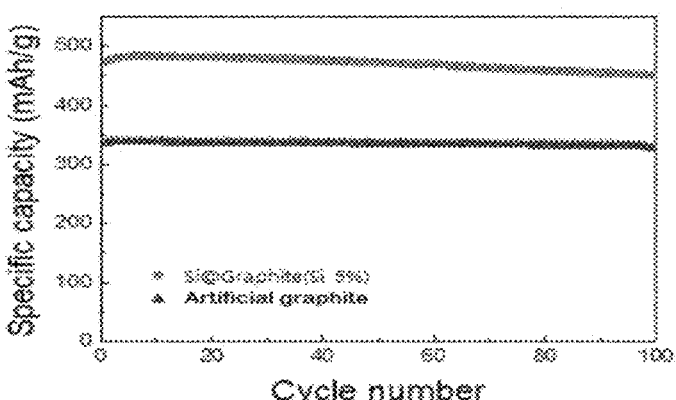
FIG. 2(b)

MANUFACTURING METHOD OF ANODE ACTIVE MATERIAL AND SECONDARY BATTERY COMPRISING THE SAME

TECHNICAL FIELD

The present invention relates to a method for preparing an anode active material and a secondary battery including the anode active material, and more specifically, to an anode active material including spherical graphite particles coated with amorphous carbon prepared by a mechanochemical reaction, a method for preparing the anode active material and a secondary battery including the anode active material.

BACKGROUND ART

Crystalline graphite, which is used as an anode active material for a lithium secondary battery, is obtained and used by preparing flaky graphite in spherical graphite particles through a granulating process. Since these spherical graphite particles are granulated without a gap between flaky graphite fragments on the surface of the particles, there is a limitation in contact with an electrolyte. Due to this, when applying these particles to the anode active material, there is a problem in that charge/discharge characteristics of the battery are reduced. This is because expansion and contraction of spherical graphite particles cannot be effectively controlled during charging and discharging processes in which lithium ions are repeatedly intercalated and deintercalated. Eventually, structures of the granulated particles become unstable as a bonding force of the flaky graphite fragments is decreased, and a reaction with the electrolyte penetrating into the particles is performed in an irreversible reaction due to repeated charging and discharging, such that an excessive solid-electrolyte interphase film is formed and a swelling phenomenon occurs.

In order to solve these problems, research and development to improve properties of spherical graphite particles have been conducted.

For example, in Korean Patent Registration Nos. 10-1965773 and 10-1919470, by applying a technique in which spheroidized natural graphite particles are subjected to ultrasonic treatment to expand gaps between the flaky natural graphite fragment particles present on the surface and inside of the spheroidized natural graphite particles, and defects of a concave-convex structure are formed on the surface of the flaky natural graphite fragment particles present on the surface and inside of the spheroidized natural graphite particles, high-rate charge/discharge characteristics and cycle life-span characteristics of the secondary battery are improved.

In addition, in Korean Patent Registration Publication No. 10-1986680, by isotropically pressing granulated particles including crystalline natural graphite powder particles and soft carbon precursor, properties of the prepared particles are improved.

When applying the conventional preparation method known in the prior art, it is possible to form gaps between the spherical particles, such that the properties of the particles as an anode active material may be improved. However, it is not possible to completely solve the problem in that the process is complicated and the bonding force of the flaky graphite fragments is reduced, such that improvement thereof is required.

SUMMARY OF INVENTION

Problems to be Solved by Invention

In consideration of the above-mentioned circumstances, it is an object of the present invention to provide a method for preparing an anode active material capable of improving high-rate charge/discharge characteristics and cycle life-span characteristics of the secondary battery by preparing spherical graphite particles through an isostatic pressing process while improving stability of flaky graphite particles.

In particular, another object of the present invention is to provide a method for preparing an anode active material through a mechanochemical reaction by utilizing a large amount of graphite byproduct particles obtained in a process of pulverizing flaky graphite.

Further, another object of the present invention is to provide a secondary battery with improved charge/discharge characteristics by using the anode active material as an anode material.

Means for Solving Problems

To achieve the above objects, according to an aspect of the present invention, there is provided a method for preparing an anode active material including the steps of: obtaining graphite byproduct particles that have not been spheroidized in a step of pulverizing and spheroidizing flaky graphite particles; preparing coated particles by liquid phase mixing of the graphite byproduct particles with composite particles to coat the surface of the graphite byproduct particles with the composite particles; spheroidizing the coated particles by performing an isostatic pressing process thereon; and pulverizing the coated particles and coating the surface thereof with amorphous carbon to prepare spherical graphite.

At this time, the composite particles may include any one of silicon (Si), tin (Sn), antimony (Sb), aluminum (Al), germanium (Ge), zinc (Zn), lead (Pb), or a mixture of two or more thereof, or an oxide thereof, or a mixture of two or more of the oxides.

In addition, according to another aspect of the present invention, there is provided a secondary battery including: an anode including the anode active material prepared by the above preparation method; a cathode disposed to face the anode and including a cathode active material; a separator provided between the cathode and the anode; and an electrolyte provided to impregnate the separator.

Advantageous Effects

According to the method for preparing an anode active material of the present invention, there are effects as follows. First, it is possible to improve high-rate charge/discharge characteristics and cycle life-span characteristics of the secondary battery by preparing spherical graphite particles through the isostatic pressing process thus to form gaps between flaky graphite particles while improving stability thereof.

In particular, it is possible to prepare an anode active material by utilizing a large amount of graphite byproduct particles obtained in a process of pulverizing flaky graphite.

Further, it is possible to improve charge/discharge characteristics of the secondary battery by using the anode active material as an anode material.

BRIEF DESCRIPTION OF DRAWINGS

FIGS. 1(a)-1(g) are views showing a concept of a process for preparing an anode active material according to the present invention.

FIGS. 2(a) and 2(b) are graphs showing test evaluation results for capacity (a) and cycle characteristics (b) of secondary batteries to which graphite including silicon deposited on a surface thereof by a conventional method and graphite including silicon bonded thereto by a mechano-chemical reaction of the present invention are applied.

MODE FOR CARRYING OUT INVENTION

Figure 3A:
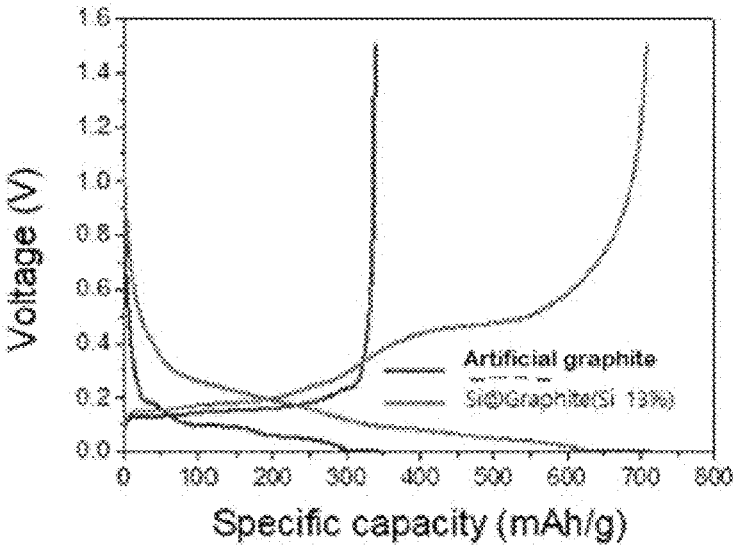
FIGS. 3(a) and 3(b) are graphs showing test evaluation results for capacity (a) and cycle characteristics (b) of secondary batteries to which artificial graphite and spherical graphite of the present invention are applied.

Hereinafter, the present invention will be described in detail. Prior to this, terms or words used in the specification and claims should not be construed as limited to a conventional or lexical meaning. Instead, based on a principle that an inventor may desirably define the concept of terms or words to describe his/her invention by means of the most preferable method, the terms or words should be construed as the meanings and concepts in compliance with technical ideas of the present invention.

The anode active material according to the present invention uses spherical graphite particles as a main material, and is technically characterized in that the characteristics of the anode active material are improved by optimizing a process for preparing spherical graphite particles.

In general, flaky graphite particles have a particle size of 30 to 200 μm, and when spheroidizing the particles by pulverizing, a yield thereof is only about 40%, and the remaining 60% remains as a graphite byproduct. That is, there is a problem in that only particles with abraded edges of the flaky graphite particles can be spheroidized, and the byproducts with sharp edges should be discarded since they are graphite fragments.

Another technical characteristic of the present invention is to provide an improved process capable of utilizing the graphite byproduct particles in addition to a process for optimizing the preparation process of the spherical graphite particles.

To this end, the anode active material according to the present invention may be prepared by a method including the steps of: obtaining graphite byproduct particles that have not been spheroidized in a step of pulverizing and spheroidizing flaky graphite particles; preparing coated particles by liquid phase mixing the graphite byproduct particles with composite particles to coat the surface of the graphite byproduct particles with the composite particles; spheroidizing the coated particles by performing an isostatic pressing process thereon; and pulverizing the coated particles and coating the surface thereof with amorphous carbon to prepare spherical graphite.

In general, when preparing spherical graphite by a dry preparation process, flaky graphite particles may be spheroidized by pulverizing through high-speed milling. In this case, since the spheroidization is performed as the graphite particles collide during the high-speed milling process, the yield thereof is only about 40%, and there is a problem in that all graphite byproduct particles that have not been spheroidized should be discarded. For example, when pulverizing and spheroidizing flaky graphite particles with a size of 30 to 200 μm by high-speed milling, spherical graphite of 3 to 20 μm are formed. Then, an anode active material is prepared by performing a surface treatment to remove a rough surface by milling the spherical graphite at a low speed, and coating the surface thereof with amorphous carbon. In this regard, there are problems in that the yield of the spherical graphite particles prepared by the above-described process is too low, and gaps between the obtained spherical graphite particles are insufficient, thereby resulting in a decrease in the charge/discharge characteristics of the battery.

Furthermore, recycling the graphite byproduct particles that have not been spheroidized causes more difficult problems in relation to the process, and even if preparing spherical graphite particles using the same, there is a very high possibility that the prepared products will be defective due to insufficient charge/discharge characteristics.

In the present invention, the problems entailed in the conventional preparation method are solved through a preparation method capable of processing the graphite byproduct particles into spherical graphite particles using an isostatic pressing process. The isostatic pressing process has the advantages for preparing spherical particles that uniform pressure can be applied and pressed to the whole of particles.

As an isostatic pressing process, a cold isostatic press (CIP) or a warm isostatic press (WIP) can be applied. In addition, pulverizing the particles, spheroidized by performing an isostatic pressing process, can make wholly uniform spherodized particles, so as to coat the surface of the pulverized spherical particles with amorphous carbon.

In one of embodiments, an isostatic pressing process can be performed in conditions of the pressure of 40 to 500 kgf/cm$^2$, the temperature of 10 to 150° C., and the time of 1 to 10 hours. In addition, a water can be generally used as a fluid for pressurization in as isostatic press. Furthermore, a mixed fluid of water with 5 to 10 vol % of hexane is desirable to improve the yield, and to obtain the spherical particles having more uniform particle-sized distribution in the subsequent pulverizing process.

a method for preparing an anode active material according to the present invention will be described with reference to FIGS. 1(a)-1(g). The anode active material may be prepared through the processes of: obtaining graphite byproduct particles generated in a step of preparing spheroidized particles by pulverizing and spheroidizing flaky graphite particles (FIG. 1(a)); preparing coated particles by liquid phase mixing composite particles with the graphite byproduct particles(FIG. 1(b)); preparing spheroidized particles by performing an isostatic pressing process to the coated particles (FIG. 1(c)); pulverzing the spheroidized particles (FIG. 1(d)), and finally preparing spherical graphite by coating a surface thereof with amorphous carbon (FIG. 1(e)).

The graphite byproduct particles are byproducts remaining after the spheroidization process and have a size of 3 to 6 μm. The graphite byproduct particles may include byproducts of natural graphite, kish graphite, or artificial graphite.

The composite particles for mixing with the graphite byproduct particles may include any one of silicon (Si), tin (Sn), antimony (Sb), aluminum (Al), germanium (Ge), zinc (Zn), and lead (Pb), or a mixture of two or more of the above components. In addition, the composite particles may include any one selected from an oxide of the above components, or a mixture of two or more of the oxides.

Generally, silicon particles are used as the composite particles. The silicon particles are adapted to have a particle size of 10 to 200 nm by pulverizing particles having a size of several μm (FIG. 1(*f*)) obtained from waste silicon (FIG. 1(*g*)).

The process of coating the surface of the graphite particles by performing surface treatment with the composite particles is a process of performing composite according to a wet process using a conventional liquid phase. In general, when performing composite by a wet process, there are problems in that the yield is low, the stability of the prepared particles is insufficient, and the charge/discharge effects are also insufficient. In the present invention, these problems are solved by post-processing through an isostatic pressing process.

Since the composite particles have a significantly smaller size than the graphite byproduct particles, they react on the surface of the graphite byproduct particles through an isostatic pressing process to form a bond therewith, and as a result, a surface coating layer is formed. In addition, when an isostatic pressing process is performed after the surface of the composite particles is coated, an effect of forming curved graphite byproduct particles having sharp edge portions may be obtained. This is because the coating is performed while nanometer-sized composite particles penetrate into the edge portion.

The spherical graphite coated with the amorphous carbon prepared as described above is used as a material for an anode active material.

Therefore, in the preparation method of the present invention, mesophase particles (the intermediate stage-spheroidized particles) having a size of 3 to 10 μm are formed before the finally produced spherical graphite is spheroidized into particles having a size of 5 to 30 μm. Then, by adding the pulverized composite particles having a size of 10 to 200 nm to the mesophase particles and processing the same under an isostatic pressing condition, it is possible to obtain spheroidized particles whose surface is coated with the composite particles can be obtained.

The spherical graphite particles prepared as described above may be applied as an anode active material. The anode active material may be included in an anode to form a secondary battery. The secondary battery may include the anode, a cathode disposed to face the anode and including a cathode active material, a separator provided between the cathode and the anode, and an electrolyte provided to impregnate the separator.

In order to confirm effects obtained when applying the anode active material of the present invention to a secondary battery, a cathode containing LNMO (LiNi$_{0.5}$Mn$_{1.5}$O$_4$) and an anode to which spherical graphite (Si content of 13%) according to the present invention is applied as an anode active material were prepared, then a full cell was prepared using the cathode and anode, followed by measuring the discharge capacity retention characteristics according to the number of charging/discharging times (cycles). In the full cell, Super-P Li and PVDF binder were applied as a conductive agent, and a separation membrane of 15 μm PE separation membrane of which both sides are coated with ceramic of 2 to 3 μm was applied as a separation membrane (separator). As the electrolyte, 1M LiPF6+EC:DEC:DMC (vol % 1:1:1) was used. In addition, for comparison, a test was conducted using conventional spherical graphite deposited with silicon prepared by a dry preparation process as an anode active material.

As a result, as shown in FIG. 2(*a*), it could be found that when the spherical graphite according to the present invention was applied as the anode active material, higher charge/discharge efficiency was exhibited than the case of using the spherical graphite according to the conventional preparation method. In addition, also from the evaluation results of the cycle characteristics, it could be confirmed that when the spherical graphite according to the present invention was applied as the anode active material, stable capacity retention rate characteristics were exhibited at the time of repeated charging and discharging under the same condition.

It is considered that these characteristics of the secondary battery are caused by improvement in the characteristics of the anode active material, since a stable composite with graphite can be formed when preparing spherical graphite by applying an isostatic pressing process in the present invention.

Figure 3B:
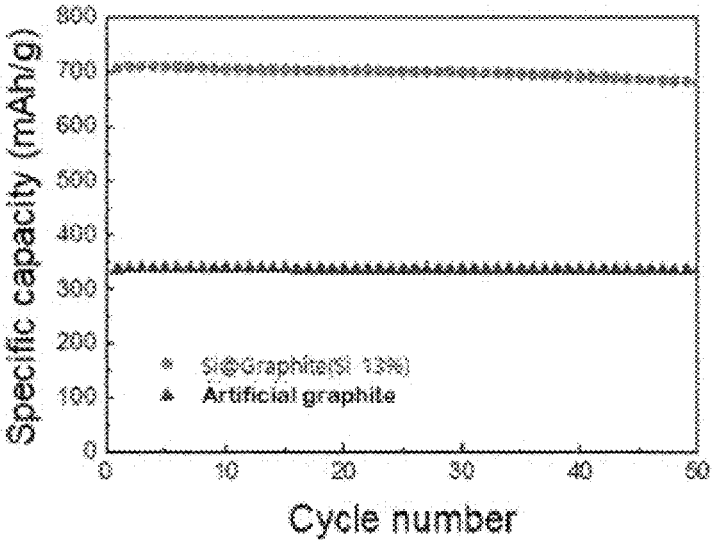

In addition, charge/discharge characteristics and capacity retention rates of the full cell using artificial graphite as the anode active material and the full cell using the spherical graphite of the present invention as the anode active material were evaluated. As a result of the evaluation, as shown in FIGS. 3(*a*) and 3(*b*), it was confirmed that improved characteristics of the secondary battery could be obtained when the spherical graphite according to the present invention was applied.

Therefore, it was confirmed that a high-quality secondary battery could be prepared by achieving improvement in electrical conductivity and improvement in output characteristics through the improved electrical conductivity when the spherical graphite according to the present invention was applied as the anode active material.

While the present invention has been described with reference to the preferred embodiments as described above, it is not limited to the above-described embodiments, and various modifications and variations may be made by persons skilled in the art to which the present invention pertains without departing from spirit of the present invention. Such modifications and variations are duly included within the scope of the present invention and the appended claims.

The invention claimed is:

1. A method for preparing an anode active material, the method comprising the steps of:

obtaining graphite byproduct particles having a particle size of 3 to 6 μm in a step of pulverizing and spheroidizing flaky graphite particles having a particle size of 30 to 200 μm;

preparing coated particles by liquid phase mixing the graphite byproduct particles with composite particles to coat a surface of the graphite byproduct particles with the composite particles;

spheroidizing the coated particles by performing an isostatic pressing process thereon in conditions of a pressure of 40 to 500 kgf/cm$^2$, a temperature of 10 to 150° C., and a time of 1 to 10 hours, using a mixed fluid of water with 5 to 10 vol % of hexane; and pulverizing the coated particles and coating a surface of the coated particles with amorphous carbon to prepare spherical graphite.

2. The method for preparing an anode active material according to claim 1, wherein the composite particles include any one of silicon (Si), tin (Sn), antimony (Sb), aluminum (Al), germanium (Ge), zinc (Zn), lead (Pb), or a mixture of two or more thereof, or an oxide of the above components, or a mixture of two or more of the oxides.

* * * * *